United States Patent [19]

Mathes

[11] 4,408,526

[45] Oct. 11, 1983

[54] NO-PLAY GEAR DRIVE FOR PRINTING MACHINES

[75] Inventor: Josef Mathes, Offenbach am Main, Fed. Rep. of Germany

[73] Assignee: M.A.N.—Roland Druckmaschinen Aktiengesellschaft, Fed. Rep. of Germany

[21] Appl. No.: 349,013

[22] Filed: Feb. 16, 1982

[30] Foreign Application Priority Data

Mar. 30, 1981 [DE] Fed. Rep. of Germany ....... 3112508

[51] Int. Cl.³ .................... B41F 13/00; F16H 55/18
[52] U.S. Cl. ..................................... 101/216; 74/440
[58] Field of Search ................ 74/440, 409; 101/216, 101/219, 248, 181, 183

[56] References Cited

U.S. PATENT DOCUMENTS

| | | | |
|---|---|---|---|
| 1,435,571 | 11/1922 | Wright | 74/440 |
| 2,696,124 | 12/1954 | Flowers et al. | 74/440 |
| 3,127,784 | 4/1964 | O'Neill | 74/440 |
| 3,296,881 | 1/1967 | Seabeck | 74/440 |
| 3,318,193 | 5/1967 | Rogg | 74/440 X |
| 3,357,273 | 12/1967 | Larson et al. | 74/440 |
| 3,407,727 | 10/1968 | Fischer | 74/440 |

Primary Examiner—J. Reed Fisher
Attorney, Agent, or Firm—Leydig, Voit, Osann, Mayer & Holt, Ltd.

[57] ABSTRACT

A no-play drive for a printing press in which a main and auxiliary driving gear are both in mesh with a driven gear. The auxiliary driving gear is mounted upon a cylindrical hub formed on the main driving gear. A plurality of axially extending bores are formed in the main driving gear and a plurality of matching conical recesses are provided in the auxiliary driving gear. Balls fitted in the respective bores have associated coil springs for pressing the balls outwardly in the direction of the recesses so that the auxiliary driving gear tends to be forcibly rocked into a detented position with respect to the main driving gear in which the matching bores and recesses are all in respective alignment. The bores and recesses are so angularly phased with respect to the gear teeth that when the auxiliary driving gear is in its detented position the teeth on the auxiliary driving gear are angularly offset by a small amount with respect to the teeth on the main driving gear with the result that the engaged teeth on the driven gear are pinched between teeth on the driving gears for removal of play between the driving and driven gears. A retaining disc secured to the hub engages the outer surface of the auxiliary driving gear to hold the latter axially captive and for the purpose of developing frictional drag for damping oscillatory movement between the main and auxiliary driving gears which tends to occur in the face of fluctuating load.

3 Claims, 6 Drawing Figures

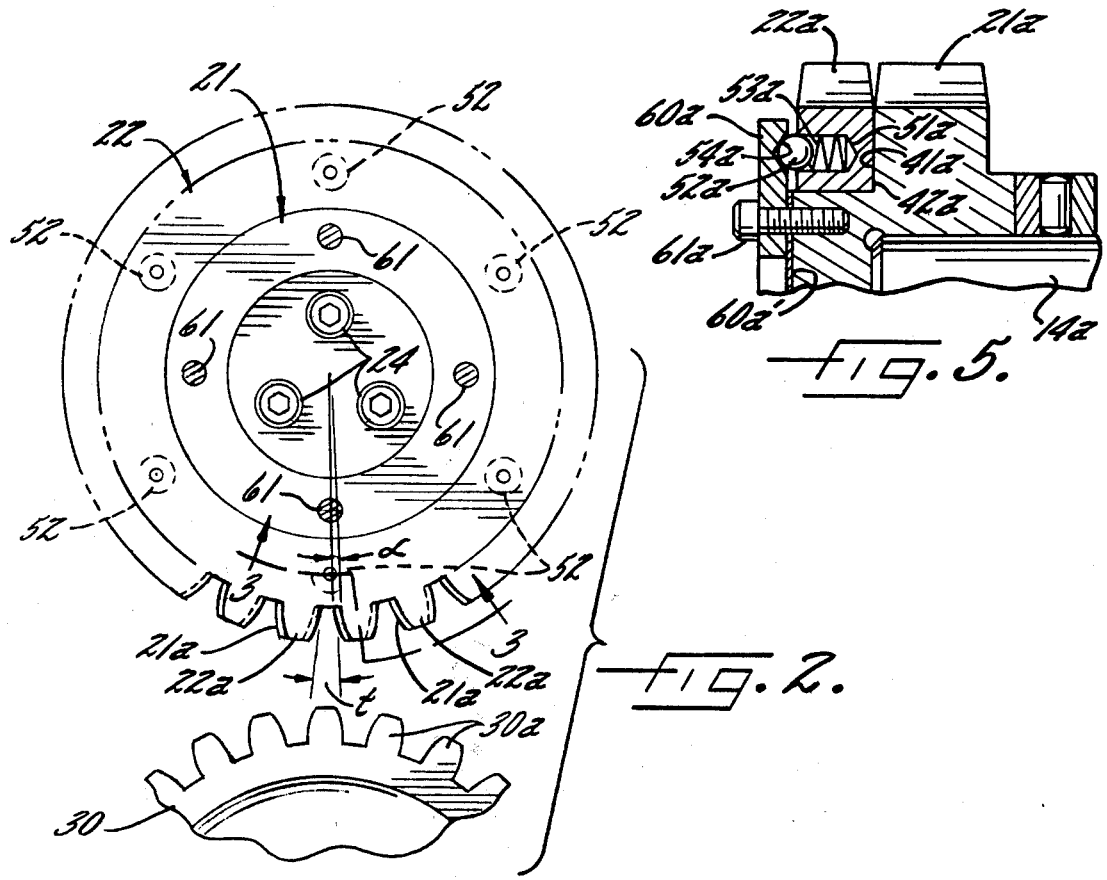
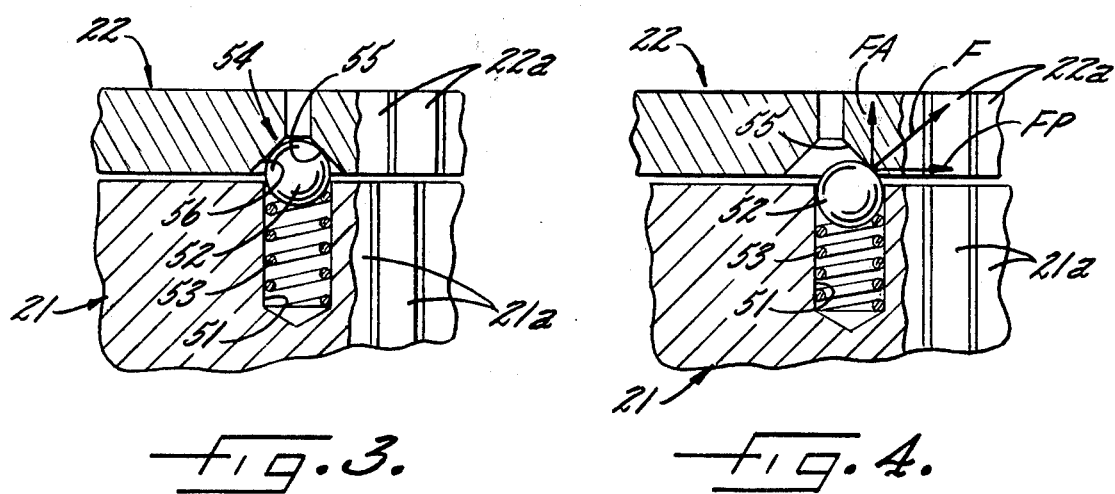

NO-PLAY GEAR DRIVE FOR PRINTING MACHINES

The gears which drive the cooperating cylinders of a printing press must be constructed so as to have minimum play if the printing is to be of high quality with the different colors in proper register. The development of a certain amount of play in engaged spur gearing is inevitable because of wear and because of the necessity of adjusting the center to center spacing between adjacent cylinders where one of the cylinders has a resilient covering.

To remove play between driving and driven gears it is known to make the driving gear in the form of a closely spaced pair of gears of identical profile rotationally coupled by a spring. This is shown in British Pat. No. 177,529 of U.S. Pat. Nos. 1,334,517 and 1,449,903. It is found however that where a pair of adjacent gears are interconnected by a spring they tend to oscillate with respect to one another particularly at high speed under conditions of variable loading.

Consequently attempts have been made to solve the problem by resorting to other structures, for example, by forming the gears comprising a pair with different numbers of teeth and with mutual braking surfaces between them. Relative creep caused by the unlike number of teeth, being opposed by the braking force, causes the teeth of the driven gear to be pinched with elimination of play, but such arrangements are not considered practical because of the expense of manufacture and the intentional wastage of energy in the brake.

It is, accordingly, an object to provide an improved no-play gear drive for a printing press or the like which eliminates play between driving and driven gears, either due to wear or due to the making of intentional adjustment in the interaxial spacing of the driving and driven shafts.

It is another object of the invention to provide a no-play gear drive capable of operating at high speed and in the face of fluctuating load free of any tendency toward oscillation. It is, more specifically, an object of the present invention to provide a no-play drive in which a pair of identically profiled gears are coupled together by a spring but in which the energy which is cyclically stored in the spring is intentionally and constantly dissipated thereby to substantially reduce the tendency toward relative oscillation between the paired gears.

It is another object of the invention to provide a no-play gear drive for printing presses and similar exacting uses which is inherently simple, which can be economically constructed in a wide range of sizes and which may be operated indefinitely and reliably with little or no maintenance expense.

Other objects and advantages of the invention will become apparent upon reading the attached detailed description and upon reference to the drawings in which:

FIG. 2 is an end view, in partial section, looking along section line 2—2 in FIG. 1.

FIG. 3 is a fragmentary view in partial section taken along the line 3—3 in FIG. 2 showing the auxiliary driving gear in its idle detented position with the teeth on the two driving gears angularly offset.

FIG. 4 is a view similar to FIG. 3 showing teeth of the driving gears in substantial alignment for no-play driving of the driven gear.

FIG. 5 is a fragmentary section corresponding to FIG. 1 but with the detent and drag surfaces occupying interchanged positions.

Figure 1:
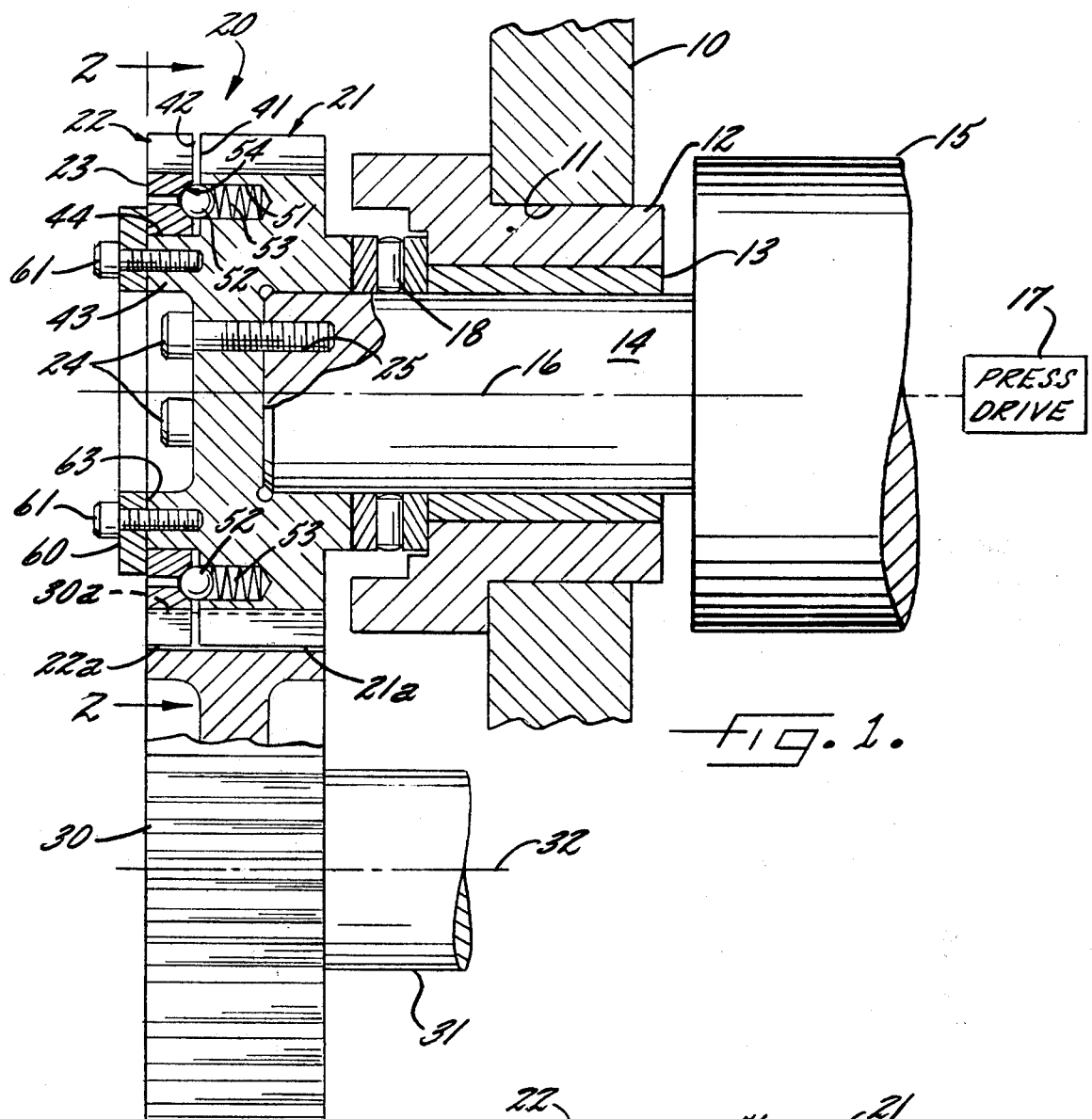
FIG. 1 is a cross-section of a gear drive constructed in accordance with the invention.
Figure 1A:
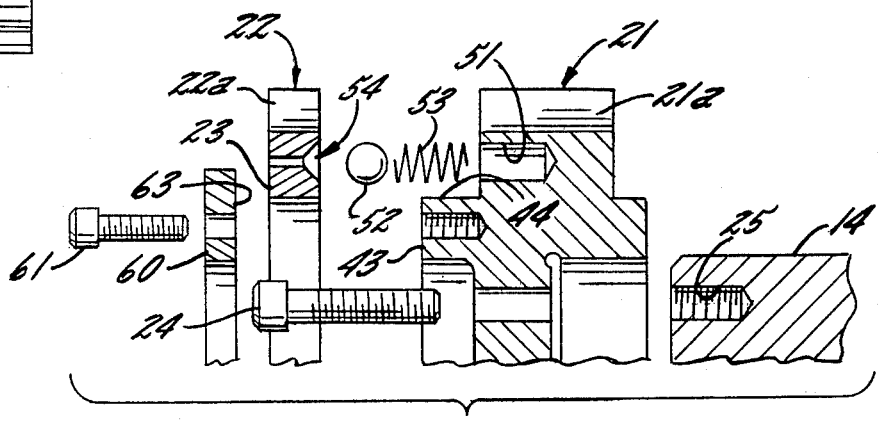
FIG. 1a is an exploded fragmentary section.

While the invention has been described in connection with certain preferred embodiments, it will be understood that I do not intend to be limited to the particular embodiments shown but intend, on the contrary, to cover the various alternative and equivalent constructions included within the spirit and scope of the appended claims.

Turning now to the drawings there is shown a portion of a printing press drive embodying the invention. The printing press has a vertical frame plate 10 having a bore 11 occupied by a shallow rockable eccentric 12 which mounts a sleeve bearing 13. The sleeve bearing serves to journal a stub shaft 14 which supports a cylinder 15 having an axis 16 and which is driven by the press drive 17. Endwise movement of the shaft is prevented by an antifriction thrust bearing 18.

Mounted at the end of the stub shaft 14, which may be referred to as the "drive" shaft, is a composite driving gear 20 which consists of a main driving gear 21 and an auxiliary driving gear 22 having an outer face 23. The main driving gear is secured to the end of the shaft by means of a set of three cap screws 24 which are received in threaded holes 25 extending axially into the end of the shaft.

Meshing with the composite driving gear 20 is a driven gear 30 connected to a driven shaft 31 which is also journaled in the frame for rotation about an axis 32 and which serves to support a companion cylinder (not shown).

The gears are of the spur type, with the teeth on the driving gears being in mesh with the teeth on the driven gear.

In accordance with the present invention the auxiliary driving gear 22, which has a profile identical to that of the main driving gear 21, is mounted on the end of the main driving gear for relative rocking movement, with the opposed faces of the driving gears, indicated at 41, 42 in closely spaced parallel relation. A plurality of axially extending bores are formed in the face of one of the driving gears and a plurality of matching conical recesses are provided in the face of the other driving gear, with balls being fitted in the respective bores, spring-pressed outwardly in the direction of the recesses, so that the auxiliary driving gear tends to be rocked into a detented position in which the matching bores and recesses are all in respective axial alignment. The bores and recesses are so angularly phased with respect to the gear teeth that when the auxiliary driving gear is in its detented position the teeth on the auxiliary driving gear are angularly offset by a small amount with respect to the teeth on the main driving gear with the result that the engaged teeth on the driven gear are pinched between the teeth on the driving gears for removal of play between the driving and driven gears.

Thus for the purpose of mounting the auxiliary driving gear 22 on the end of the main driving gear, the main driving gear is formed with a hub 43 having a cylindrical supporting surface 44, while the auxiliary driving gear 22 is of annular shape dimension to seat on the surface for relative rocking movement about the central axis 16. Spaced at equal radii and at equal intervals on the presented face 41 of the main driving gear are a set of bores 51 having balls 52 respectively fitted therein, with each ball being outwardly pressed by a coil spring 53. Arranged in matching positions on the face 42 of the auxiliary driving gear 22 are matching conical recesses 54 having walls 55, 56 which are convergently angled in at least the peripheral direction (see FIGS. 3 and 4). Because of the convergence of the recesses and the centering effect of the balls the auxiliary driving gear 22 tends to be rocked into a detented position with respect to the main driving gear in which the bores and matching recesses are all in respective alignment.

In carrying out the invention the bores 51 and recesses 54 are so angularly phased with respect to the gear teeth that when the auxiliary driving gear is in its detented position, shown in FIG. 2, the teeth, indicated at 22a, on the auxiliary driving gear 22 are offset by a small angle indicated at α with respect to the teeth, indicated at 21a, on the main driving gear 21. This reduces the effective interdental spacing to an amount t which is less than the width of the teeth 30a on the driven gear, with the result that the engaged teeth on the driven gear are forcibly pinched between the teeth on the driving gears to produce a complete absence of play.

In accordance with one of the features of the present invention, means are provided, at the outer end of the hub 43 on the main driving gear, for maintaining the auxiliary driving gear 22 in axially captive position, notwithstanding the axial force exerted against the auxiliary driving gear by the springs 53 and for exerting a fractional drag. The retaining member is in the form of a disc 60 secured to the end of the hub 43 by a set of cap screws 61. The disc 60 is dimensioned to overlap the auxiliary driving gear 22 and to present a surface 63 which engages the surface 23 of the auxiliary gear, the surfaces 23, 63 being intentionally surfaced to provide drag between the main driving gear 21 and the auxiliary driving gear 22. Such frictional drag, which is approximately proportional to the force exerted by the coil springs 53, effectively damps out the oscillation which tends to occur between the auxiliary driving gear 22 and the main driving gear 21 at high speed with a fluctuating load. Thus the present construction effectively overcomes the oscillation problem experienced using a simple pair of gears arranged side by side rotationally interconnected by a spring.

Before the gears are meshed together all of the balls 52 are centered in their detents 54 as illustrated in FIG. 3 and the teeth 21a, 22a are angularly offset as shown in FIG. 2. When the gears are meshed, the teeth 30a of the gear 30 wedge apart the teeth 21a, 22a of the driving gears and occupy a snug, pinched position completely free of play. The relative rocking of the auxiliary gear causes each ball 52 to be cammed upwardly along the angled surface 55 of the cooperating recess, as shown in FIG. 4. This develops, at the point of contact of the ball, a force F having a peripheral component FP which produces the pinching action and an axial component FA which, effective at the frictional surfaces 23, 63, produces the desired frictional drag resulting in the damping action.

Experience has shown that the no-play drive meets all of the requirements of a modern high speed printing press. The play is reduced to zero both in the face of wear and in the face of minor adjustment in the spacing between the axes 16, 32 of the shafts and their respective cylinders. The construction is simple and highly economical and may be applied to driving and driven gears having a wide range of size. The construction is inherently compact, with the composite driving gear 20 occupying only slightly more space than a driving gear not having the no-play feature. Partly because of its inherent simplicity the device can be expected to operate reliably without maintenance over long periods of time.

In the preferred construction, as described, the bores containing the balls are formed in the main driving gear and the recesses are formed in the auxiliary gear. It will be appreciated by one skilled in the art that these locations can be reversed without departing from the invention. Also in the preferred embodiment, it is the driving gear 20 which is of composite construction while the driven gear 30 is unitary. If desired, as an alternative, the driven gear may be made composite while the driving gear is unitary; in other words driving can take place in the opposite direction, provided that the sense of the angle α is such that driving force is transmitted through gear teeth 21a, 30a. Thus the term "driving" and "driven" as employed herein will be understood to be relative terms which may be used interchangeably.

The structure described above, while particularly intended for use in printing presses, is equally useful in other mechanisms including driving and driven shafts which must be coupled together completely free of play either as a result of wear or as a result of intentional interaxial adjustment of shaft spacing.

The term "conical recess" is intended to cover any recess capable of accommodating the associated ball in which the sidewalls are convergently tapered relative to one another in at least the peripheral direction so that upon relative rocking movement the ball tends to be squeezed into its bore against the force of the adjacent spring.

While the invention has been described in connection with the embodiment illustrated in FIG. 1, it will be understood by one skilled in the art that the invention may be practiced with equal advantage employing the modified structure shown in FIG. 5 in which the detent and drag surfaces have been interchanged. In this figure functionally corresponding elements have been indicated by the same reference numerals with the addition of subscript a. Thus, there is provided, on shaft 14a a main driving gear 21a having coaxially mounted thereon an auxiliary driving gear 22a having adjacent faces 41a, 42a in closely parallel relation. In this embodiment it is the auxiliary gear 22a which has a plurality of axially extending bores 51a (one being shown), each fitted with a ball 52a pressed by a spring 53a. Each ball has a matching conical recess 54a. The recess is formed in a retainer disc 60a which is secured to the main drive gear by bolts 61a. A shim 60a' may be optionally provided to vary the force of the detent.

As in the earlier embodiment the bores and recesses are so angularly phased with respect to the gear teeth that when the auxiliary driving gear is in its detented position the teeth on the gear are angularly offset by a small amount with respect to the teeth on the main gear to provide the described pinching action. The reaction force of the spring 53a is exerted at the frictional surfaces 41a, 42a to provide the frictional drag which damps the oscillatory movement which tends to take place in the face of fluctuating load.

I claim:

1. In a drive for a printing press having a drive shaft and a driven shaft, a main driving gear on the drive shaft and a driven gear on the driven shaft, the main driving gear having coaxially mounted thereon for limited rocking movement an auxiliary driving gear the main and auxiliary driving gears having adjacent faces in closely spaced parallel relation and having identical profiles, the gears all being of the spur type with the teeth on the driving gears being in mesh with the teeth on the driven gear, a plurality of axially extending bores in the face of one of the driving gears and a plurality of matching conical recesses in the face of the other driving gear, balls fitted in the respective bores and having associated springs for pressing the balls outwardly in the direction of the recesses so that the auxiliary driving gear tends to be rocked into a detented position with respect to the main driving gear in which the matching bores and recesses are all in respective alignment, the bores and recesses being so angularly phased with respect to the gear teeth that when the auxiliary driving gear is in its detented position the teeth on the auxiliary driving gear are angularly offset by a small amount with respect to the teeth on the main driving gear with the result that the engaged teeth on the driven gear are pinched between the teeth on the driving gears for removal of play between the driving and driven gears, the auxiliary driving gear having a flat axially facing outer surface, and a retaining member rigidly fixed to the main driving gear and having a flat annular surface which is presented to the flat outer surface of the auxiliary driving gear to hold the latter captive against relative outward movement and to develop a frictional drag between the driving gears for damping relative oscillatory movement between them which tends to take place in the face of fluctuating load.

2. In a drive for a printing press having a drive shaft and a driven shaft, a main driving gear on the drive shaft and a driven gear on the driven shaft, the main driving gear having a projecting cylindrical hub, an auxiliary driving gear having a profile identical to the main driving gear and of annular shape for mounting on the hub with the opposed faces of the driving gears in closely spaced parallel relation, means for retaining the auxiliary driving gear on the hub, the gears all being of the spur type with the teeth on the driving gears being in mesh with the teeth on the driven gear, a plurality of axially extending bores in one of the driving gears and a plurality of matching conical recesses in the other of said driving gears, balls fitted in the respective bores and having associated openings for pressing the balls outwardly into the recesses so that the auxiliary driving gear tends to be rocked into a detented position with respect to the main driving gear in which the matching bores and recesses are all in respective alignment, the bores and recesses being so angularly phased with respect to the gear teeth that when the auxiliary driving gear is in its detented position the teeth on the auxiliary driving gear are angularly offset by a small amount with respect to the teeth on the main driving gear with the result that the engaged teeth on the driven gear are pinched between the teeth on the driving gears for removal of play between the driving and driven gears, the retaining means being in the form of a disc member rigidly secured to the outer end of the hub and dimensioned to radially overlap the auxiliary driving gear for maintaining a constant spacing between the driving gears, the disc member and auxiliary driving gear having annular surfaces in extensive flat engagement with one another for absorbing the reaction force of the springs and for developing a frictional drag between the main driving gear and auxiliary driving gear for damping relatively oscillatory movement between them which tends to take place in the face of fluctuating load.

3. In a drive for a printing press having a drive shaft and a driven shaft, a main driving gear on the drive shaft and a driven gear on the driven shaft, the main driving gear having coaxially mounted thereon for limited rocking movement an auxiliary driving gear, the main and auxiliary driving gears having adjacent faces in closely parallel relation and having identical profiles, the gears all being of the spur type with the teeth on the driving gears being in mesh with the teeth on the driven gear, one of the driving gears having a plurality of axially extending bores and the other gear having a plurality of matching conical recesses, balls fitted in the repective bores and having associated springs for pressing the balls outwardly of the bores in the direction of the recesses so that the auxiliary driving gear tends to be rocked into a detented position with respect to the main driving gear in which the matching bores and recesses are all in respective alignment, the bores and recesses being so angularly phased with respect to the gear teeth that when the auxiliary driving gear is in its detented position the teeth on the auxiliary driving gear are angularly offset by a small amount with respect to the teeth on the main driving gear with the result that the engaged teeth on the driven gear are pinched between the teeth on the driving gears for removal of play between the driving and driven gears, and means providing flat axially engaged annular frictional surfaces between the main and auxiliary driving gears to develop a frictional drag between them for damping relative oscillatory movement which tends to take place in the face of fluctuating load.

* * * * *